United States Patent
Li et al.

(10) Patent No.: US 12,515,400 B2
(45) Date of Patent: Jan. 6, 2026

(54) SYSTEM AND METHODS FOR HIGH RESOLUTION MICROFLUIDIC CHANNEL FABRICATION VIA CO-PHASE FLOW ENABLED ADDITIVE MANUFACTURING

(71) Applicant: Purdue Research Foundation, West Lafayette, IN (US)

(72) Inventors: Tian Li, West Lafayette, IN (US); Yanbin Wang, Greenbelt, MD (US); Arezoo Ardekani, West Lafayette, IN (US); Ziyang Huang, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 123 days.

(21) Appl. No.: 18/204,318

(22) Filed: May 31, 2023

(65) Prior Publication Data
US 2024/0157637 A1    May 16, 2024

Related U.S. Application Data

(60) Provisional application No. 63/347,456, filed on May 31, 2022.

(51) Int. Cl.
*B29C 64/209*  (2017.01)
*B29C 64/295*  (2017.01)
*B81C 1/00*    (2006.01)

(52) U.S. Cl.
CPC .......... *B29C 64/209* (2017.08); *B29C 64/295* (2017.08); *B81C 1/00119* (2013.01)

(58) Field of Classification Search
CPC ......... B28B 1/001; B29C 48/09; B29C 48/23; B29C 64/209; B29C 64/295; B33Y 10/00; B33Y 50/02; B33Y 30/00
See application file for complete search history.

(56) References Cited

U.S. PATENT DOCUMENTS

| | | | |
|---|---|---|---|
| 2011/0236669 A1* | 9/2011 | Tal | B29C 48/11 264/40.6 |
| 2021/0114276 A1* | 4/2021 | Nelson | B29C 48/16 |
| 2022/0273958 A1* | 9/2022 | Garai | A61N 1/0573 |

OTHER PUBLICATIONS

Liu, Y. et al., Why microfluidics? Merits and trends in chemical synthesis. Lab on a Chip (2017). doi:10.1039/c7lc00627f.
(Continued)

*Primary Examiner* — Jamel M Nelson
(74) *Attorney, Agent, or Firm* — Purdue Research Foundation

(57) ABSTRACT

A system is provided for generating a microfluidic channel. The system may include a co-flow generator having a delivery tube configured to provide a support liquid. The co-flow generator may include a coupling having an outlet configured to provide an epoxy resin. The delivery tube may be centrally positioned in the outlet of the coupling such that the delivery tube and the outlet together eject a co-flow of epoxy and support liquid into a tubular shell. The system may further include a conductive ring defining a hole through which the tubular shell extends. Heating the conductive ring causes or hastens curing of the epoxy resin to form a micro-channel defined by the cured epoxy around the support liquid.

8 Claims, 7 Drawing Sheets

(56) References Cited

OTHER PUBLICATIONS

Sahoo, H. R. et al., Multistep Continuous-Flow Microchemical Synthesis Involving Multiple Reactions and Separations. Angew. Chemie Int. Ed. 46, 5704-5708 (2007).

Waheed, S. et al., 3D printed microfluidic devices: Enablers and barriers. Lab on a Chip (2016). doi:10.1039/c6lc00284f.

Wu, D. et al., Femtosecond laser rapid prototyping of nanoshells and suspending components towards microfluidic devices. Lab Chip 9, 2391-2394 (2009).

Lind, J. U. et al., Instrumented cardiac microphysiological devices via multimaterial three-dimensional printing. Nat. Mater. (2017). https://doi.org/10.1038/nmat4782.

Guerrero, J. et al., Capillary-Based Microfluidics—Coflow, Flow-Focusing, Electro-Coflow, Drops, Jets, and Instabilities. Small 16(9), 1-15 (2020). https://doi.org/10.1002/smll.201904344.

Kim, P. et al., Soft lithography for microfluidics: A Review. Biochip Journal, 2(1), 1-11 (2008).

Lively, R. P. et al., Hollow fiber adsorbents for $CO_2$ removal from flue gas. Indusrial and Engineering Chemistry Research, 48(15), 7314-7324 (2009). https://doi.org/10.1021/ie9005244.

Sutrisna, P. D. et al., Surface functionalized UiO-66/Pebax-based ultrathin composite hollow fiber gas separation membranes. Journal of Materials Chemistry A, 6(3), 918-931 (2018). https://doi.org/10.1039/c7ta07512j.

Tian, Y., e al. Hollow fibers: From fabrication to applications. Chemical Communications, 57(73), 9166-9177 (2021). https://doi.org/10.1039/d1cc02991f.

Wang, X. Y. et al. An artificial blood vessel implanted three-dimensional microsystem for modeling transvascular migration of tumor cells. Lab on a Chip, 15(4), 1178-1187 (2015). https://doi.org/10.1039/c4lc00973h.

Wang, Z. et al., Magnetically-driven drug and cell on demand release system using 3D printed alginate based hollow fiber scaffolds. International Journal of Biological Macromolecules, 168, 38-45 (2021). https://doi.org/10.1016/j.ijbiomac.2020.12.023.

Huang, Z. et al., A consistent and conservative Phase-Field model for hermo-gas-liquid-solid flows including liquid-solid phase change. Journal of Computational Physics 449 (2022) 110795.

Panhwar, M. H. et al., High-throughput cell and spheroid mechanics in virtual fluidic channels. Nat. Commun. (2020) doi:10.1038/s41467-020-15813-9.

* cited by examiner

SYSTEM AND METHODS FOR HIGH RESOLUTION MICROFLUIDIC CHANNEL FABRICATION VIA CO-PHASE FLOW ENABLED ADDITIVE MANUFACTURING

CROSS REFERENCE TO RELATED APPLICATIONS

This application claims the benefit of U.S. Provisional Application No. 63/347,456 filed May 31, 2022, the entirety which is incorporated by reference herein.

TECHNICAL FIELD

This disclosure relates to additive manufacturing and, in particular, to microfluidic channel fabrication.

BACKGROUND

Microfluidic devices are fundamental building blocks of lab-on-chip and organs-on-chips, as well as the key elements of research in areas such as chemical synthesis, fluid dynamics, and biomedical science. Their applications include organic molecular synthesis, nanoparticle fabrication, solid particle separation, and bioreactors. Higher resolution microfluidic devices often can lead to better control of the channel morphology and higher precision particle handling/separation. However, due to the limited manufacturing routes, current microfluidic systems are typically restricted to approximately a few centimeters in size and their manufacturing often involves time and energy-consuming multi-step processes with insufficient resolution.

For example, soft lithography is a commonly adopted method to assemble thin films into a three-dimensional microfluidic structure. This approach often suffers from low yield and high cost. In addition, it is inevitable to re-design and re-fabricate the photomask if the structure design must be modified. Additive manufacturing, such as one-photon based 3D printing technology, has been used to eliminate the process of thin film assembly and photomask preparation. However, challenges remain in fabricating enclosed microfluidic channel networks with a diameter less than 500 µm.

BRIEF DESCRIPTION OF THE DRAWINGS

The embodiments may be better understood with reference to the drawings and description. The components in the figures are not necessarily to scale. Moreover, in the figures, like-referenced numerals designate corresponding parts throughout the different views.

DETAILED DESCRIPTION

Figure 1:
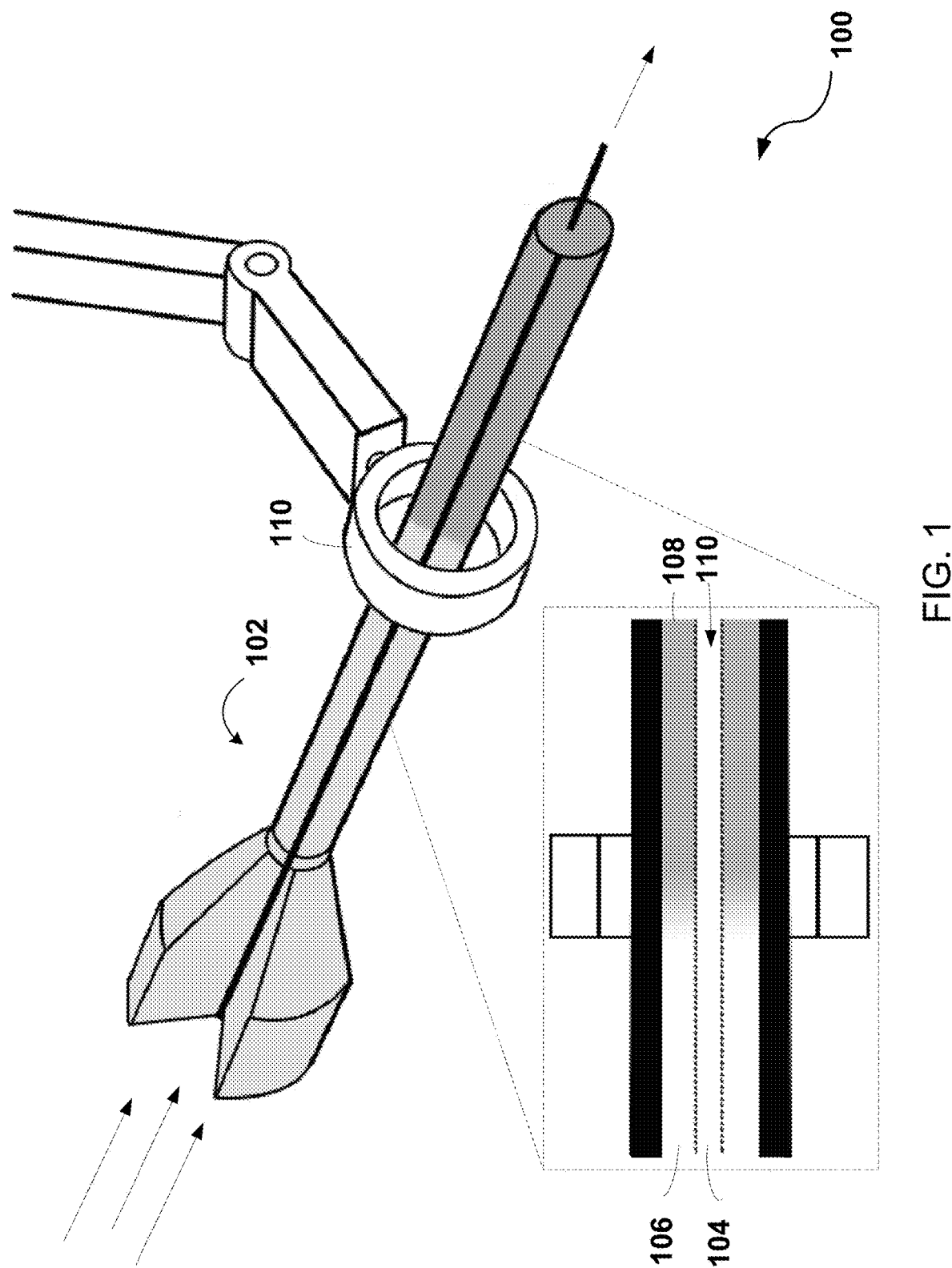
FIG. 1 illustrates a first example of a microfluidic channel generation system.

Inkjet 3D printing (i3DP), stereolithography (SLA), two-photon polymerization (2PP), and fused deposition modeling (FDM) are widely used techniques in 3D printing. However, printing methods still struggle to provide scalable yet high resolution microfluidic channel fabrication. For example, i3DP and SLA printing can provide good scalability and accuracy. However, the main challenge lies in printing small channels (i.e., sub-100 µm) and removing uncured resin and/or support structures. For i3DP, a solid brace will, by default, be created inside an enclosed channel to provide the necessary support, which is impossible to remove. For SLA, it is also challenging to remove uncured resin (usually with a high viscosity ~300 mPas at room temperature) from a small, enclosed channel. Owing to the difficulties to effectively remove non-structural materials, most of the i3DP and SLA printers cannot print enclosed channels with a diameter lower than 500 µm. 2PP printing can provide ultra-high resolution (~1 µm), but it can take days to print a structure with a volume of 10 cm3.7, 11 FDM has a low resolution of ~800 µm, making it the low attractive option for microfluidic structure fabrication.

The co-flow methodology described herein offers technical advantages for achieving high-resolution 3D printing as compared to existing technologies, such as those listed in Table 1. Typically, feature size and resolution are important criteria used to evaluate the printing quality across different technologies, where the feature size refers to the minimal size of an isolated voxel and resolution refers to the minimal distance between two well-separated adjacent printed structures.

TABLE 1

Additive manufacturing printing technology used in microfluidics

| | Inject 3D Printing | Stereolithography (SLA) | Two-Photon Polymerization (2PP) | Fused Deposition Modeling (FDM) | Co-Flow Based Microfluidic Channel Generation |
|---|---|---|---|---|---|
| Representing Model | Projet 3500 | Form3 | Nanoscribe | 3DTouch | N/A |
| Minimum Microchannel size | 500 µm | 500 µm | 100 µm | 800 µm | 10-100 µm |
| Resolution | Moderate | Moderate | High | Low | High |
| Scalability | Good | Good | Poor | Good | Good |
| Cost | Moderate | Moderate | High | Low | Moderate |
| Difficulty in increasing | Difficult to remove | Difficult to remove | Difficult to remove | Difficult to control | N/A |

TABLE 1-continued

Additive manufacturing printing technology used in microfluidics

|  | Inject 3D Printing | Stereolithography (SLA) | Two-Photon Polymerization (2PP) | Fused Deposition Modeling (FDM) | Co-Flow Based Microfluidic Channel Generation |
|---|---|---|---|---|---|
| Resolution | support structure | uncured resin | uncured resin | resolution below 100 μm | |

Widely used techniques like SLA, or the similar technique digital light processing (DLP), utilize light to cure photopolymer resin. SLA uses a laser system to select the active region from the uncured resin reservoir to induce a polymerization reaction. DLP uses a high-resolution projector to distinguish the active region from the non-active region. In principle, the feature size of SLA/DLP is limited by the optical diffraction [e.g., ~390 nm if the wavelength is assumed to be 780 nm and the numerical aperture (NA) to be 1, d=λ/(2NA)]. However, the SLA/DLP resolution (on the order of tens of micrometers) is far beyond the optical diffraction limit. Here, SLA/DLP uses a one-photon technique where photons will start to induce reaction once the light intensity is higher than the threshold for polymerization. Meanwhile, photons can penetrate the resin or solidified structures at a depth ranging from hundreds of nanometers (UV) to hundreds of micrometers (IR), so that they still can induce polymerization reaction away from the laser focus region. In other words, not only the resin around the beam focus spot gets cured but some resin out of the focus region gets cured as well. Clearly, the polymerization out of the beam focus region is unwanted, and it is hard to quantify its impact.

One way to improve the resolution and feature size is to utilize the 2PP method, where two photons (generally with the same frequency) are required to reach photo-initiators simultaneously to excite the molecules from the ground state and then decompose to radicals, which makes 2PP fundamentally different from any one-photon technique (SLA/DLP etc.). In terms of feature size, the 2PP absorption rate of energy is proportional to the square of light intensity, while the one-photon technique absorption rate of energy is proportional to the light intensity, making the 2PP polymerized region smaller than that of SLA/DLP. So, the feature size limit of 2PP is beyond the optical diffraction limit, reaching to a level of 100 nms. In terms of printing resolution, the synergic effect (simultaneous two photons absorption) guarantees that the two-photon absorption only happens in the laser beam focus region and prevents polymerization reaction out of the vicinity of the focus region. Improvements in terms of both feature size and resolution are possible as the polymerization region can be precisely controlled following the CAD designs. However, the feature size quality improvement (from ~390 nm to ~100 nm) is considerably smaller than the resolution improvement (from ~10 μm to ~100 nm), which indicates that limiting polymerization within the desired region (beam focus spot) is the fundamental reason why 2PP is much more successful in printing quality as compared to one-photon techniques (SLA/DLP). However, there are two barriers preventing the 2PP method from being widely used to print enclosed microfluidic channels: (1) the photopolymers have a high viscosity (similar to SLA/DLP), making them hard to be removed from printed structures. (2) the environment control needed is time and energy consuming, limiting the scale and yield.

So, the photon-based techniques have made progress in achieving high-resolution, but the uncured photopolymer removal is a bottleneck in printing enclosed structures. The situation gets worse with the decrease of the channel dimension, due to the dominating capillary effects.

The system and methods for co-flow-based microfluidic channel generation, described herein, provide a technical advantage using heat as a curing source. Heat traditionally has not been considered as an ideal candidate for high-resolution printing as it is difficult to have good directional control of heat transport in a uniform medium. In the field of additive manufacturing, a thermosetting polymer is rarely used alone as an active material, because when the temperature is increased beyond the polymerization threshold, the heat will quickly be dispersed to the surroundings and trigger a crosslinking reaction, creating challenges in defining well-separated structures in a resin reservoir. So, techniques using heat as the curing source usually use a thermoplastic polymer that deposits a soft polymer at an elevated temperature onto a substrate by a moving nozzle. Then the hardening happens when the deposited polymer cools down. Since the deposited material is solid and does not deform much, the control of the printed features is challenging and the product profiles are low in resolution.

To the contrary, the system and methods described herein provide precise polymerization region control by the generated two-phase laminar flow, making it possible to use a thermosetting polymer, rather than a thermoplastic polymer, as the only active material. Instead of a single-phase flow, i.e., resin, the two-phase laminar flow consists of a non-reactive core flow and a reactive shell flow. The two liquids do not mix due to the laminar nature of the flow, and more importantly, it allows an accurately defined reaction region. In other words, the polymerization can only happen in the outer fluid layer, where the resin responds to the external heat stimulus, so the reaction region is limited between the pre-printed wall surface and boundary of core flow, eliminating the need for precise control over the curing system. Heat as a curing source will bring additional benefits, for example, it does not have a penetration limit and costs much less than building a sophisticated optical system.

Additional and alternative technical advantages are made evident in the system and methods described herein.

FIG. 1 illustrates a first example of a microfluidic channel generation system 100. The system 100 may include a tubular shell 102. The tubular shell 102 may receive the flow of a support liquid 104 and a liquid epoxy resin 106. The support liquid 104 may include low viscosity, non-reactive liquid which does not harden or cure when exposed to heat. For example, the support liquid 104 may include an oil, such as a paraffin oil. The support liquid 104 and resin 106 may centrally flow through the tubular shell 102 in a laminar co-flow. The co-flow may include the epoxy resin 106 and the support liquid 104 where the support liquid 104 is radially inward from the epoxy resin 106 within the shell 102.

As the epoxy resin cures into cured epoxy 108, the support liquid 104 may define a microchannel channel 110. The support liquid 104 may flow through the micro channel 108, and eventual eject from the tubular shell 102 and hardened epoxy 108.

In some examples, a heater 110 may be used to heat the tubular shell 102, and the epoxy 106 included therein. In some examples, the heater 110 may include a ring heater defining a hole through which the tubular shell 110 extends. The ring heater may move along a length of the tubular shell 110 to promote uniform curing. In some examples, the heater may be controlled by a linear stage or some other actuation motor. Alternatively or in addition, the heater 110 may start at a first end of the tubular shells and move toward a second end, additively curing the epoxy resin along the length of the tubular shell.

To significantly reduce the dimensions of the microchannel to sub-100 μm, the system generates a laminar co-flow inside a tubular shell. In some examples, the tubular shell may include a printed channel that is prepared at with an inner dimension (~500 μm). The inner dimension may be further reduced using the co-flow and curing described herein. A tapered structure, such as a cone, may be connected to the pre-printed channel. Fluids may be pumped from a reservoir to the tapered entry. The fluids may include a non-reactive support liquid will be at the center and reactive thermosetting epoxy resin that fills the space between support liquid and solid wall of the tubular shell. Once the laminar flow inside the channel reaches steady state, it will form a non-reactive phase and a reactive phase.

The thickness of the support liquid follows the relation:

$$\frac{D}{D_{pre} - D} = \frac{Q_1}{Q_2} \cdot \frac{\eta_1(\dot{\gamma})}{\eta_2(\dot{\gamma})} \quad (1)$$

where Q1 is the support liquid volumetric flow rate, Q2 is the resin volumetric flow rate, η1(γ) is the support liquid viscosity, and η2(γ) is the outer resin viscosity. By matching these variables, the support flow thickness can be controlled to be as low as 10 μm. Subsequently, a thermal source (such as a ring heater) will be turned on to induce a polymerization reaction at the liquid-wall interface. A new polymer layer will be formed until the resin supply is cut off, after which the flow will become a single phase. The manufacturing process will be ended by turning off the support liquid supply, so the residual liquid inside the newly made channel will be entirely the support liquid, eliminating the need to remove the uncured resin.

A large parameter space is available to select a supporting liquid with low viscosity by controlling Q1, Q2, and η2(γ). For example, when a paraffin oil (viscosity of ~25 mPas at room temperature) is used, it reduces the residual liquid viscosity by more than 10 times (compared to SLA resin). Therefore, at the end of the dimension reduction process, a channel with size of D~10-100 μm may be created without facing the difficulty in removing residual liquid inside the channels. The material selection for the outer shell may include clear light-activated resins, photopolymers with transmittance higher than 90% or commercially available ultra-clear thermosetting epoxy resins. With the transparent outer tube, the flow pattern can be visualized towards better control and flow adjustment.

High-fidelity computational fluid dynamics (CFD) simulations may be used to provide accurate parameter settings for co-flow generation in complex geometries. Once the CFD prediction is experimentally validated, trial-and-error attempts can be massively reduced, which is essential to enhancing scalability and controlling cost. Compared to soft lithography, this method will provide an equivalent printing resolution, while achieving much higher scalability at a lower cost.

Figure 2A:
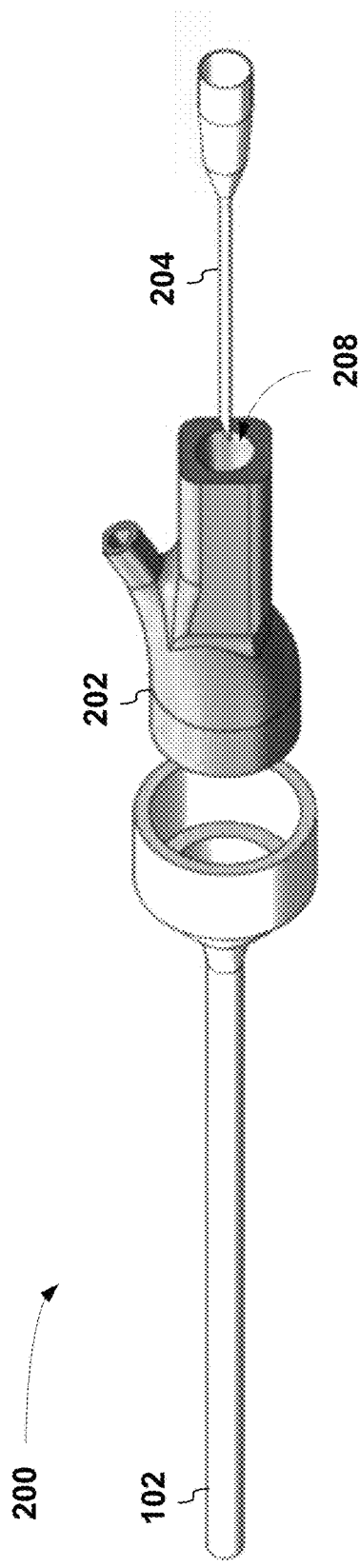
FIG. 2A-B illustrates an example of a co-flow generator having a coupling nozzle with a tubular shell and a delivery tube.
Figure 2B:
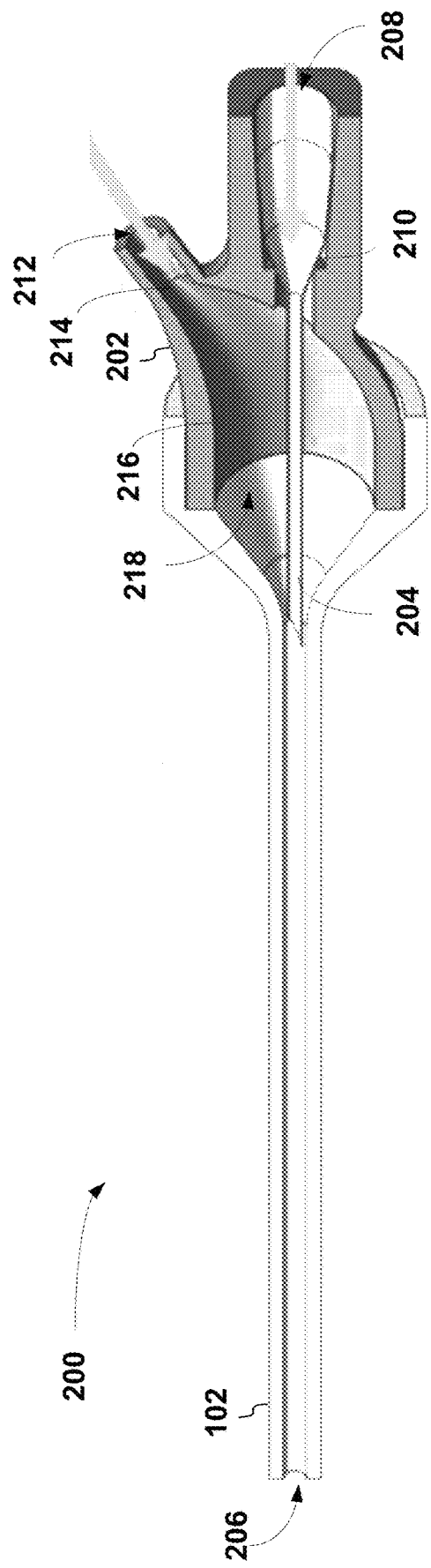

FIG. 2A-B illustrates an example of a co-flow generator 200 having a coupling nozzle 202 (hereinafter referred to as coupling) with a tubular shell 102 and a delivery tube 204. FIG. 2A is an exploded view and FIG. 2B is a cross section view. The delivery tube 204 may receive the support liquid and directs the support liquid into the tubular shell 102. The delivery tube 204 may extend into and be at least partially disposed within a passageway 206 defined by the tubular shell 102. The passageway 206 may have a larger diameter than the diameter of the delivery tube 102. In some examples, an end of the delivery tube 102 which receives the support liquid may be larger than an end of the delivery tube 102 which ejects the support liquid. It should be appreciated that various sized delivery tubes may be interchangeably used to vary the desired aspects of the microchannel being formed.

The coupling 202 may include at least two inlets. A first inlet 208 may receive the delivery tube 204 and/or the support liquid. The first inlet 208 may expose a first passageway 210 tapered and/or shaped to receive the delivery tube 204. A second inlet 212 may receive the liquid epoxy resin. The second inlet may enter into a second passageway 214. The first and second passageways may combine into a third passageway 216 that leads to an outlet 218.

The delivery tube 204 may extend through the first inlet 208 of the coupling 202, the first passageway 210, the third passageway 216. In some examples, the delivery tube 204 may further extend further into the tubular shell 102, as shown in FIG. 2. During operation, the epoxy resin may enter the second inlet 212 of the coupling, pass through the second passageway 214 and into the third passageway 216. The resin may at least partially fill the third passageway 216 around the delivery tube 102. As the resin flows past the delivery tube 102, the support liquid may exit the delivery tube 102, thus creating the laminar co-flow.

In various experimentations, the tubular shell and the container were manufactured by an SLA 3D printer, so the diameter of the cone can be easily adjusted. The liquid resin was pumped into the first passageway from the upper inclined entrance of the two-flow container. Syringe needles or capillary tubes can be served as core flow deliver tubes where the support liquid was injected into the nozzle. To ensure the deliver tube and outer shell are coaxially aligned, a cross-section of the fitting tapered portion of the deliver tube was designed as a square shape. Alignment is naturally achieved by matching the outer diameter of the delivery tube and the inner side of the square cross-section of the two-flow container.

In various experimentation and to provide context to possible dimensions, the total height of the whole device may be 125 mm. The diameter of the two-flow container may be 17 mm. The inner diameter of the exit of the cone entry may be 1.5 mm, and the outer diameter may be 3.4 mm. The length of the cylindrical channel may be 80 mm.

Of course, other dimensions are possible depending on the implementation and desired outcome.

Figure 3:
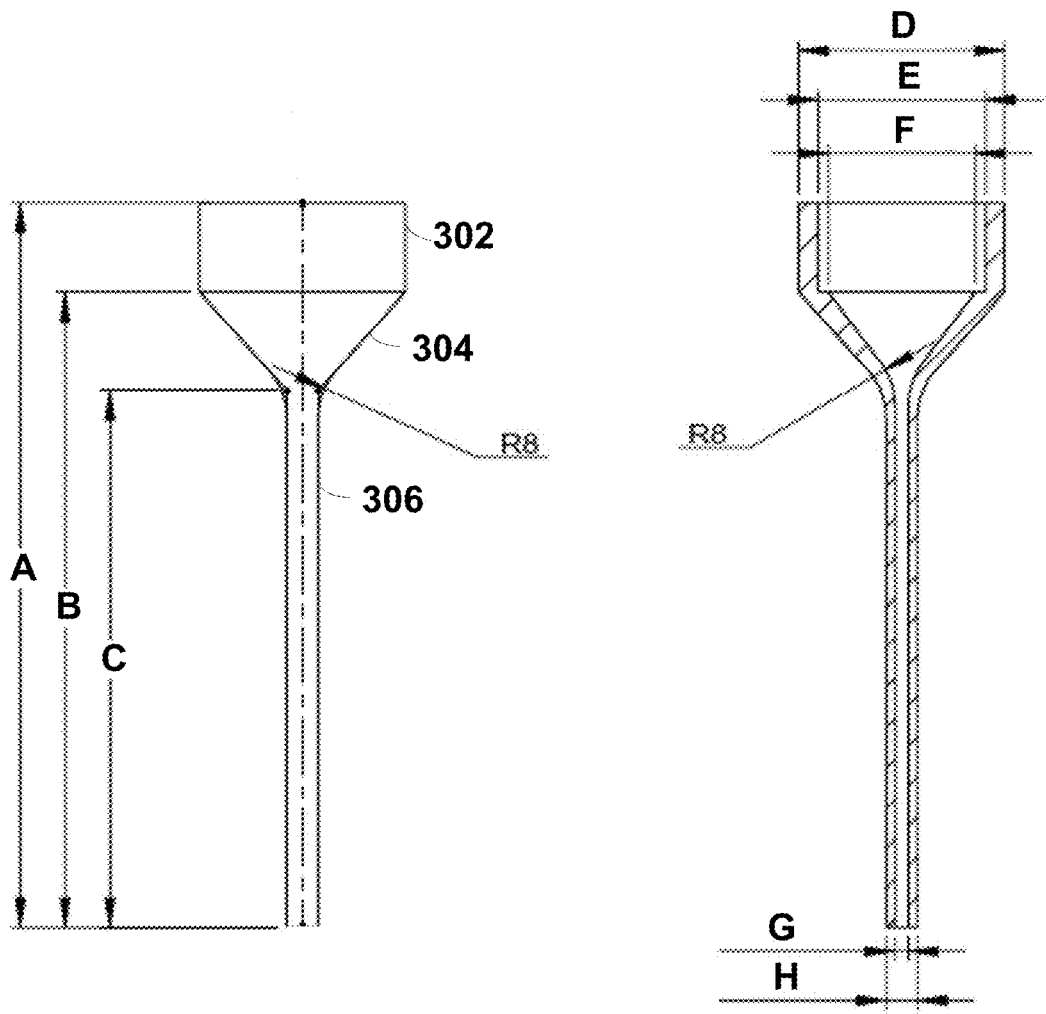
FIG. 3 illustrates an example of a tubular shell.

FIG. 3 illustrates an example of a tubular shell. The tubular shell 102 may include an inlet section 302, followed by a tapered portion 304 which connects to a tube 306 with a second diameter smaller than the diameter of the inlet section. The inlet section, tapered portion, and/or tube may be formed as a unitary piece. Alternatively, the inlet section 302 and tapered portion 304 may be reusable coupled with the tube 306. In some examples, the tapered portion 304 may include a cone, or other geometries, which tapper toward the tube 306. The tubular shell may include various dimensions, as exemplified in FIG. 3 and Table 2. These dimensions are provided as an example, but may be varied in practice, depending on the design considerations of the microchannel desired.

TABLE 2

Example Dimensions for Tubular shell

| | |
|---|---|
| Length of tubular shell (A) | 81 mm |
| Length of tapered portion and tube(B) | 71 |
| Length of tube (C) | 60 |
| Outer diameter of inlet (D) | 23 |
| Inner diameter of inlet (E) | 18.70 |
| Diameter of tapper opening (F) | 16.40 |
| Inner diameter of outlet (G) | 1.5 |
| Outer diameter of outlet (H) | 3.5 |

Figure 4:
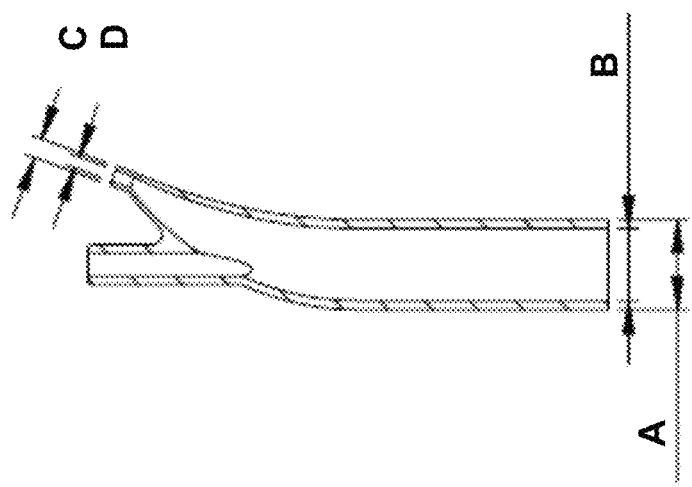
FIG. 4 illustrates an example of a coupling.
Figure 4:
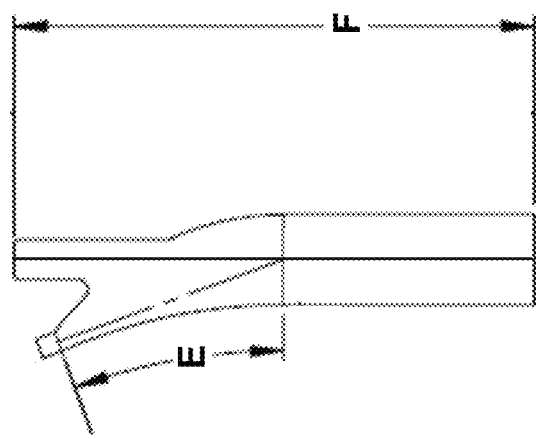

FIG. 4 illustrates an example of the coupling. The coupling may include various dimensions exemplified by FIG. 4 and Table 3. These dimensions are provided as an example, but may be varied in practical, depending on the design considerations of the microchannel desired.

TABLE 3

Example Dimensions for Coupling

| | |
|---|---|
| First Inlet outer diameter (A) | 18 mm |
| First inlet inner diameter (B) | 14.40 mm |
| Second inlet outer diameter (C) | 4 |
| Second inlet inner diameter (D) | 2.4 |
| Second inlet angle to centerline (E) | 20 degrees |
| Length of coupling (F) | 104 |

Figure 5:
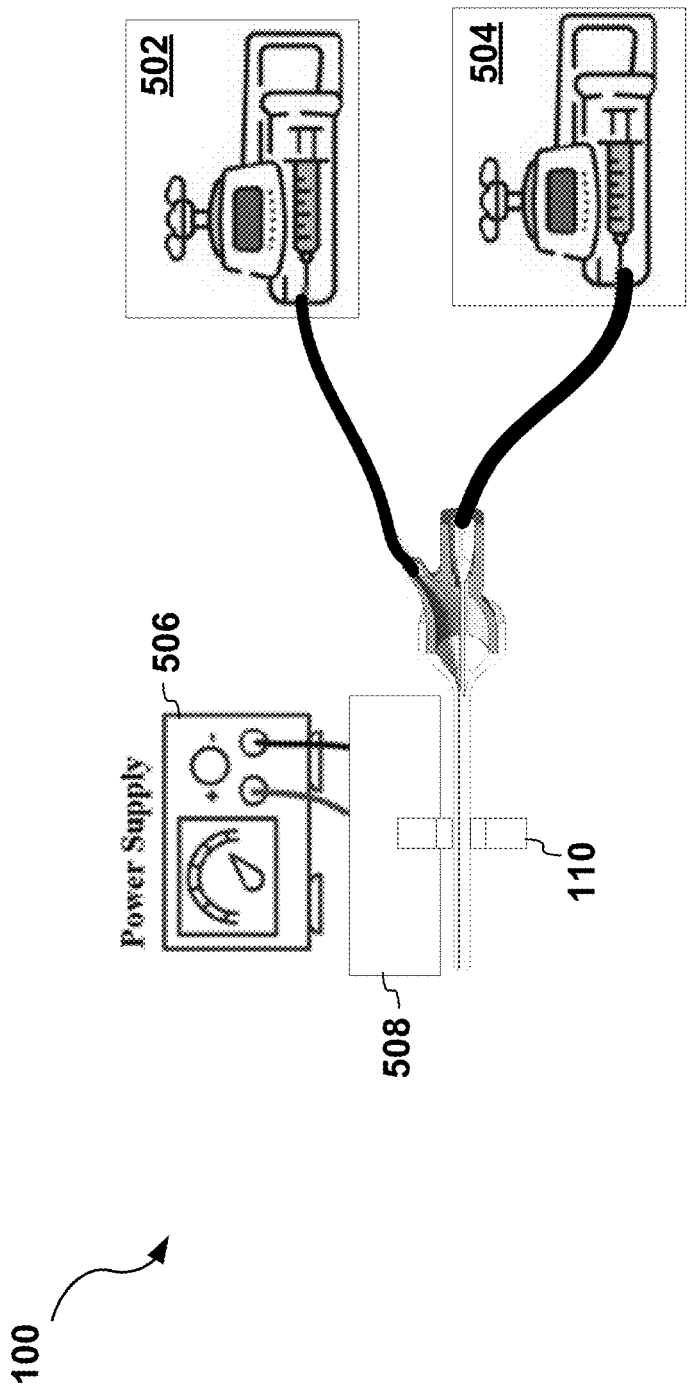
FIG. 5 illustrates a second example of a microfluidic channel generation system.

FIG. 5 illustrates a second example of the system 100. The system may include an epoxy source 502 and a support liquid source 504. The epoxy source 502 may include a reservoir to store the epoxy 502. The epoxy source 50 may further include a pump or a syringe to push the support liquid along a supply line to the co-flow generator.

The support liquid source 504 may include a reservoir to store the support liquid. The support liquid source 504 may further include a pump or a syringe to push the support liquid along a supply line to the co-flow generator.

The system may further include a power source to heat a heating element, such as the ring heater. In some examples, the system may include a motor 508, such as a linear stage, to control the location of the heating element.

Experiments

The effects of curing temperature and viscosity in the resin design: The combination of thermosetting polymer and the corresponding support liquid is an important aspect of the resin design. Following the discussion on Equation (1), both liquids affect the flow rate and channel width. So, it is important to investigate the rheology, curing temperature, and curing time of each resin design.

A low chemical reactivity liquid me be utilized as the core flow and epoxy resin with diluent as the shell flow. This combination will define the range of the system temperature ($T_{sys}$). During the process of two-phase co-flow generation, $T_{sys}$ will be kept significantly lower than the polymerization temperature. After the flow reaches the steady state, $T_{sys}$ may be increased to a value higher than the polymerization temperature. Accordingly, the viscosity of both liquids may be measured in the range of $T_{sys}$ with a wide range of shear rate. The viscosity ratio $\eta1(\gamma)/\eta2(\gamma)$ in Equation (1) controls the core flow diameter (D).

A paraffin oil may be used for the support liquid due to its low reactivity and viscosity, and epoxy-based resin will be selected for the reactive material. A typical thermosetting resin consists of epoxy, hardener, and diluent. To simplify the problem, a commercially available epoxy resin that comes with a hardener may be used and the components and concentration of diluent may be varied to tune the viscosity ratio. The diluents can be generally classified into non-reactive and reactive, depending on whether they are involved in the polymerization reaction. Benzol alcohol (BA) may be used as the representative of non-reactive diluents and alky glycidyl ether (AGE), 1,6 hexanediol diglycidyl ether (HDDGE), and 1,4-butanediol diglycidyl ether (BDDGE) as the representatives of reactive diluents.

The curing temperature and time of each resin may be related as a function of diluent type and concentration. There are certain design parameters to narrow down: (1) the curing temperature shall be well below paraffin oil flash temperature (215° C.), (2) the curing temperature should be higher than the room temperature so that it does not cure by itself; (3) the curing temperature shall also be lower than the pre-printed material softening temperature (Formlabs high temp resin has a heat deflection temperature (HDT) of 289° C. of 25 MPa). So, ideally, the curing temperature shall roughly be in a range of 80° C. and 150° C.

Effects of flow parameters of two-phase co-flow generation: With the rheology data, the volumetric flow ratio may be derived between two liquids. The absolute flow rate of each phase may be optimized and decided in the following steps. In addition, different inlet designs such as varying cone angles and diameters designed to find the operation space for the location of the interface.

Effects of system temperature and temperature gradient setting in resin curing: A programmable ring heater may be utilized to deliver heat to the pre-printed host surface, and the heater, temperature, and ramping rate are may be tuned to optimize curing. Besides the determination of heater parameters, multiple factors may be considered and tuned to optimize the heating protocol design. First, the resin design decides the target temperature for the heater, a temperature higher than the polymerization threshold. Accordingly, the flow temperature should remain under the target temperature before the heater turns on. If the target temperature is close to the room temperature, the small difference would have a limited impact on the two-phase co-flow stability. Accordingly, we can set a high paraffin oil flow rate as the liquid in the reservoir is at room temperature and will quickly ramp up to the target temperature after entering the inlet. On the other hand, if the target temperature is substantially higher than the room temperature, the liquids may be pre-heated before pushing them into the channel to reduce the difference between flow temperature and target temperature. So, the temperature gradient would not disrupt the co-flow as much as raising the temperature from the room temperature.

In this case, the paraffin oil flow rate may be set to a low level to allow the flow to have sufficient time to absorb heat from the wall, which further reduces the temperature fluctuations around the liquid in the region of inlet and the entrance of channel.

The resin residence time (time monomers stay at a cross section) distribution depends on the tubing diameter, flow rate, viscosity, and the mean residence time. The residence time distribution is broader (meaning resin at the liquid-wall interface moves slower) when the system has a wider tubing diameter, longer overall residence time, and higher viscosity. Accordingly, the above-mentioned factors may be tuned to ensure resin at the interface stays long enough for the polymerization reactions to take place.

Phase-Field Based CFD Approach to Understand the Flow Physics in the Present of Phase Change A high-fidelity fully resolved computational tool may provide not only unravel the flow physics in the presence of the phase change but also to guide the design and optimize the parameters settings in experiments. Critical information including the flow profile and temperature distribution in an enclosed system during phase change will be obtained.

The first task is to evaluate the flow stability in the scenarios created by our proposed co-flow methods. Prior work focusses on isothermal flows with fixed boundary conditions. In the system and methods described herein, the flow has two main characters that differ from previous studies: (1) radial temperature gradient. The temperature gradient exists between the ring heater and the center of the channels. (2) solidification. The liquid-solid phase change happens from the wall towards the center of the channels, so the boundary of the flow simulated moves along the radial direction. These two factors are coupled and affect the flow profiles simultaneously. Intensive research has been carried out to study the flow stability under a radial temperature gradient, however, most of prior studies focus on describing the system when it is in a steady state. The system and methods described herein, on the other hand, is not in steady state due to the moving boundary. The flow velocity field and temperature distribution are explicit functions of time. In addition, recent studies have shown complex flow patterns in microfluidic channels in presence of corners and junctions even when viscous effects are dominant, and flow is laminar. Simulations may provide insights into the effects of dimensionless parameters, such as Reynolds number, Prandtl number, and Brinkman number on the flow profile.

The CFD simulations should describe both flow profile and the liquid-solid phase change accurately and efficiently. For the present multiphase problem, we propose a consistent Phase-Field model for gas-liquid-solid flows including liquid-solid phase change. This model includes a gas phase in the simulation that could be used to evaluate the impact of possible bubble generation on the printing quality, and it physically couples the popularly used Phase-Field methods for solidification/melting, by carefully analyzing the transport of the volume fractions and masses of different phases. We will then couple this method with the distributed-Lagrange multiplier method to handle complex channel geometries as explained in the next sections.

The volume fraction of the solid in the proposed model is governed by a partial differential equation, instead of an algebraic relationship for the temperature in the existing models. The local mass conservation is strictly satisfied and therefore the volume changes during solidification/melting is captured, which is seldom considered in the existing models. The momentum transport is consistent with the mass transport of the gas-liquid-solid mixture, which greatly improves the robustness of the model for large density and large viscosity ratio problems. The model will be consistent in the sense that i) it accurately reduces to the Phase-Field method for isothermal gas-liquid flows, ii) it accurately reduces to the Phase-Field method for solidification/melting, and iii) it is consistent with the local mass conservation of the gas-liquid-solid mixture. The consistency of the proposed model with the isothermal gas-liquid flows prevents producing any fictitious fluctuations of the temperature. Previous models in the literature do not satisfy the consistency conditions. All of the dependent variables are defined in a fixed regular domain, which is convenient for numerical implementation. Both the interfacial tension at the interface and the no-slip boundary at the solid interface are modeled implicitly as body forces in the momentum equation. Here, the governing equations are briefly introduced.

The volume fraction of the material experiencing solidification/melting is denoted by $\varphi$, and it is governed by the Cahn-Hilliard equation:

$$\frac{\partial \varphi}{\partial t} + u \cdot \left| \nabla \varphi = \nabla \cdot J_\varphi, \right. \tag{2}$$

where J$\varphi$ is the Cahn-Hilliard diffusion flux.

The volume fraction of the liquid inside the material experiencing solidification/melting is denoted by $\phi$, and it is governed by the Allen-Cahn equation:

$$\frac{\partial \phi}{\partial t} + u \cdot \nabla \phi = -M_\phi \xi_\phi, \tag{3}$$

where M$\phi$ is the mobility and $\xi \phi$ is the chemical potential including both the curvature and temperature driven effects.

The mass of the gas-liquid-solid mixture is conserved, resulting in the mass conservation equation for p, the density of the gas-liquid-solid mixture:

$$\frac{\partial \rho}{\partial t} + \nabla \cdot m = 0, \tag{4}$$

where m represents the mass flux. From this equation, we find that the velocity is not divergence-free when the densities of the liquid and solid phases of the material are different, which produces the volume change due to solidification/melting.

The motion of all the phases are governed by the momentum equation for the velocity:

$$\frac{\partial (\rho u)}{\partial t} + \nabla \cdot (m \otimes u) = -\nabla P + f_\mu + f_b + f_s + f_{ns}, \tag{5}$$

where P is the pressure, $f_\mu$ and $f_b$ are the viscous and buoyancy forces, while $f_s$ and $f_{ns}$ are the forces to model the surface tension and the no-slip boundary condition at the phase boundaries.

Figure 6:
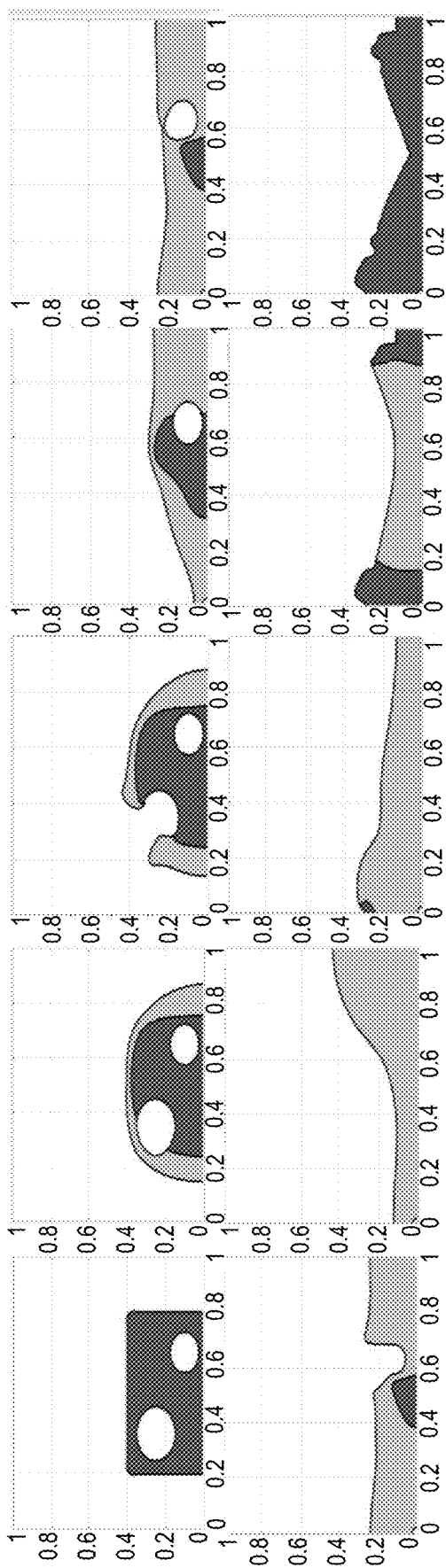
FIG. 6 illustrates example of the gas-liquid-solid flows including liquid-solid phase changes.

The temperature T is governed by the energy conservation equation with heat transfer:

$$\frac{\partial (\rho h)}{\partial t} + \nabla \cdot (mh) = \nabla \cdot (\kappa \nabla T), \tag{6}$$

where $h=C_pT+L\varphi\phi$ is the specific enthalpy of the mixture, Cp is the specific heat, L is the latent heat, and κ is the heat conductivity. A corresponding consistent scheme for the proposed model is developed and it preserves the consistencies of the model on the discrete level. Results using our code with a maximum density ratio of 6750 are shown in FIG. 6. Initially, a rectangular solid (blue) with two circular gas (white) defects is sitting at the bottom of the domain. All the boundaries except the bottom one have a fixed temperature larger than the melting temperature of the solid, while the bottom boundary has a zero heat flux. The solid rectangle begins to melt, and the gas defects are released. The solid rectangle turns into liquid (orange), and a large surface wave is produced at the gas-liquid interface. Then the boundary temperature reduces to a value lower than the melting temperature. The liquid (orange) begins solidifying from the lateral boundaries, and finally turns back into a solid with an irregular shape.

The above-mentioned proposed method is transformative as it will be capable of accurately handling phase change for large density and viscosity ration problems. The proposed two-dimensional method will be also extended to 3D and we will combine it with the distributed Lagrange-Multiplier method developed by the PIs to apply it to non-rectangular domains as well as junctions. The details of our DLM for flows around arbitrarily shaped particles are given in.

Printing Junctions

The flow motion can be very different at the corners and junctions. As an example, secondary flows exist near T junctions or corners even in the low Reynold number regime can trap low-density particles and bubbles. Moreover, secondary flows are also observed in a laminar flow at the corners of curved microfluidic channels even when the Reynolds number is low. The secondary flows can greatly affect the flow stability and cause mixing of the phases. Therefore, the understanding of these secondary flows is necessary prior to applying the proposed method in printing any non-straight channels.

The system and methods described herein may include embodiments to extend the co-flow method to printing a Y junction (T junction can be regarded as a special case) based on an evaluation the secondary flow effects. One of the most critical differences from printing a straight channel is that the Y junction printing depends on the choice of flow direction, and its impact will be carefully studied.

Since the solid-liquid interface can move towards the channel center while the shape of the interface is complicated compared to that in printing a straight channel, it is important to extend the numerical method proposed previously so that it enforces the no-slip boundary condition on an arbitrarily shape channel and handles a moving interface due to phase change. The code for an arbitrary shaped channel may be developed using a distributed Lagrange multiplier method developed in the co-PI Ardekani group. This computational method helps us satisfy the no-slip boundary condition on the surface of the channel. With the simulations, we anticipate describing the shape moving interface as a function of time during the phase change and how the interface affects the profiles of these three-dimensional secondary flows. The shape of the moving interface and profiles of secondary flows govern the channel profile and cross section shape at the end of the manufacturing process. Such understandings will greatly facilitate our experiments in printing a Y junction.

Figure 7:
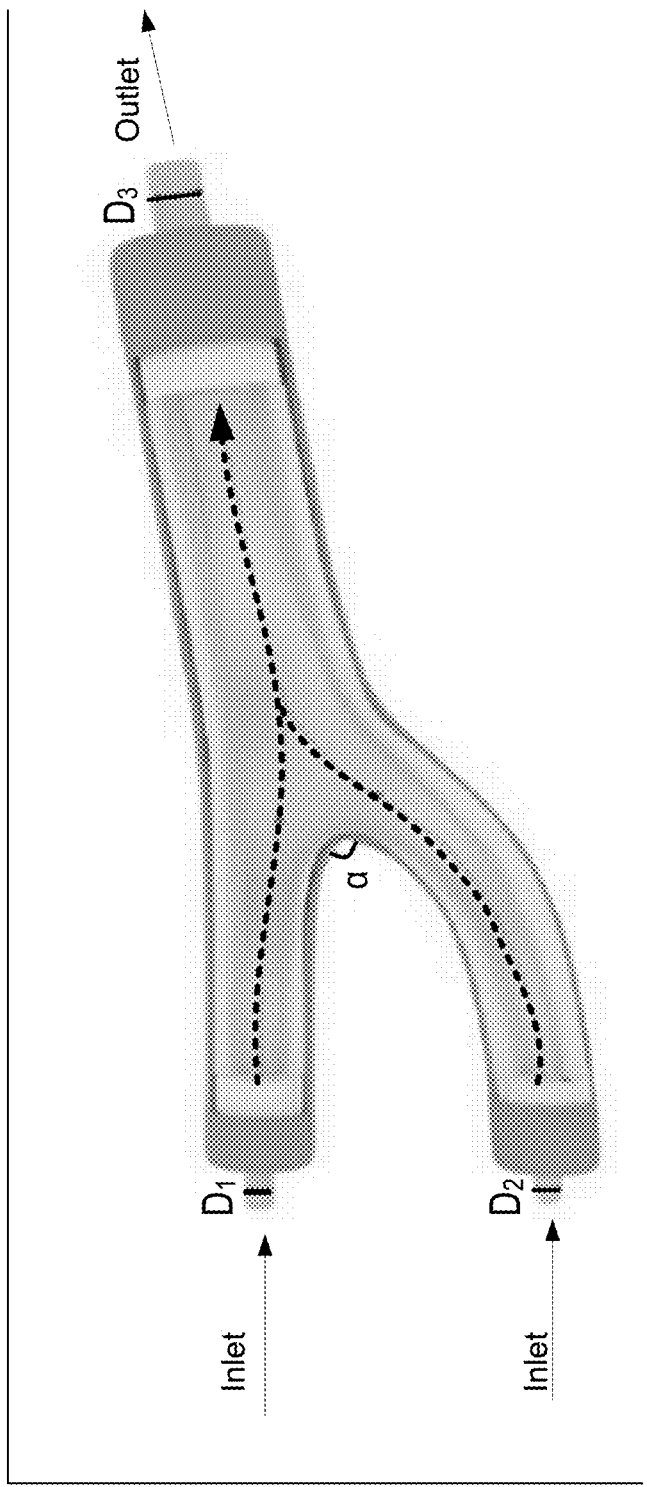
FIG. 7 illustrates a schematic showing a complex channel cross sectional areas, including elliptical shape, plaques on wall, and varying channel diameter along the flow direction.

Here, to achieve Y junction printing by controlling the co-flow profile two approaches are considered. (1) Flow-merging strategy. One option is to guide the flow through two small branches and merge them into a big branch, as shown in FIG. 7. Adopting this flow direction would ensure resin will cover most of the wall-liquid interface. In other words, the resin layer (yellow shell in FIG. 7 is able to cover the outer layer of the Y junction, as well as the joint region between two small branches. However, since flow in these two small branches contains both resin and support liquid, it is possible that they mix into one phase under the influence of secondary flow.

Another approach is to guide the flow into the system through the big branch. The co-flow will split into two flows after passing the joint region. Adopting this direction would help alleviate the resin-paraffin oil mixing issue with the least disruption to the co-flow stability. Furthermore, as discussed above, the secondary flows affect the shape of the solid-liquid interface, and their impact on these two strategies can be very different. Numerical simulations may be carried out for different flow directions, flow parameters, core-flow diameter (D1, D2, and D3 in FIG. 7, and small branch separation angle (a in FIG. 7) to evaluate the impact of vortical motions on the final product profiles. Experiments may be conducted to verify the predictions (interface shape and product profiles) made by the numerical simulations. Moreover, with the help of verified simulation results, we can adjust the pre-printed channel profiles so that the final channel profiles are close to the desired designs.

The system may be implemented with additional, different, or fewer components than illustrated. Each component may include additional, different, or fewer components.

While various embodiments have been described, it will be apparent to those of ordinary skill in the art that many more embodiments and implementations are possible. Accordingly, the embodiments described herein are examples, not the only possible embodiments and implementations.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

What is claimed:

1. A system for generating a microfluidic channel, comprising:
    a delivery tube configured to provide a support liquid which is non-curable by heat;
    a coupling having an outlet configured to provide an epoxy resin which is curable by heat, the delivery tube being centrally positioned in the outlet of the coupling such that the delivery tube and the outlet together eject a co-flow of epoxy resin and support liquid into a tubular shell; and a conductive ring defining a hole through which the tubular shell extends, wherein heating the conductive ring while the co-flow travels through the tubular shell causes or hastens curing of the epoxy resin to form a micro-channel defined by the cured epoxy resin around the support liquid, wherein the tubular shell includes an opening where the support liquid is ejected from the microchannel during curing of the epoxy resin.

2. The system of claim 1, wherein the coupling has a first inlet and a second inlet, the first inlet configured to receive the delivery tube, the second inlet configured to receive the epoxy resin, wherein the coupling guides epoxy resin from the first inlet around the delivery tube and to the outlet.

3. The system of claim 1, wherein the delivery tube is centrally positioned within the outlet of the coupling.

4. The system of claim 1, wherein tubular shell has an inlet, wherein the outlet of the coupling receives the inlet of the tubular shell.

5. The system of claim 4, wherein the delivery tube is received by the tubular shell.

6. The system of claim 4, wherein the tubular shell includes a cone which detachably couples to the tubular shell and the coupling.

7. The system of claim 1, wherein the ring is connected to a motor or actuator configured to move the ring along a length of the tubular shell.

8. The system of claim 1, further comprising a support liquid source and an epoxy resin source, the support liquid source configured to move the support liquid through the delivery tube and into the tubular shell, the epoxy resin source is configured to move the epoxy resin through the container and into the tubular shell.

* * * * *